United States Patent [19]

Schulenburg

[11] Patent Number: 5,057,229

[45] Date of Patent: Oct. 15, 1991

[54] APPARATUS AND PROCESS FOR THE TREATMENT OF COOLING CIRCUIT WATER

[75] Inventors: Michael Schulenburg, Mettmann, Fed. Rep. of Germany

[73] Assignee: Henkel Kommanditgesellschaft auf Aktien, Duesseldorf-Holthausen, Fed. Rep. of Germany

[21] Appl. No.: 537,216

[22] Filed: Jun. 12, 1990

Related U.S. Application Data

[63] Continuation of Ser. No. 239,713, Sep. 1, 1988, abandoned.

[30] Foreign Application Priority Data

Sep. 2, 1987 [DE] Fed. Rep. of Germany ....... 3729270

[51] Int. Cl.$^5$ .................. G05D 11/08; G05D 11/13; C02F 1/50
[52] U.S. Cl. .................... 210/743; 210/744; 210/746; 210/96.1; 210/139; 210/206; 210/764; 210/696; 422/7
[58] Field of Search ............... 210/743, 744, 746, 206, 210/96.1, 139, 696, 764; 422/7

[56] References Cited

U.S. PATENT DOCUMENTS

| | | | |
|---|---|---|---|
| 4,284,501 | 8/1981 | Schön et al. | 210/96.1 |
| 4,563,272 | 1/1986 | Yoshida et al. | 210/93 |
| 4,631,530 | 12/1986 | Gasper | 210/739 |
| 4,648,043 | 3/1987 | O'Leary | 210/143 |
| 4,659,459 | 4/1987 | O'Leary et al. | 210/143 |
| 4,767,511 | 8/1988 | Aragon | 210/743 |
| 4,830,757 | 5/1989 | Lynch et al. | 210/742 |

FOREIGN PATENT DOCUMENTS

| | | | |
|---|---|---|---|
| 0207804 | 1/1987 | European Pat. Off. | 210/96.1 |
| 3103126 | 1/1981 | Fed. Rep. of Germany | 210/743 |

*Primary Examiner*—Peter Hruskoci
*Assistant Examiner*—Krisanne Shideler
*Attorney, Agent, or Firm*—Ernest G. Szoke; Wayne C. Jaeschke; Real J. Grandmaison

[57] ABSTRACT

A process and an apparatus are disclosed for the monitoring and treatment of circulating water of open circulation systems, preferably in cooling tower circulation systems, in which at least one partial minor stream is continuously diverted from the main circulating water supply and directed through a compact module in which, in an automatic sequence, the pH value of the partial stream is measured and adjusted by the addition of any necessary acid, the conductivity of the partial stream is measured, preferably inductively, and an elutriation unit is activated to drain excessively conductive water, corrosion inhibitor is added to the partial stream in dependence upon the quantity of fresh water added to the circulating water, organic and/or inorganic biocides can be added and the partial stream is filtered and returned continuously to the main circulating water supply.

12 Claims, 1 Drawing Sheet

APPARATUS AND PROCESS FOR THE TREATMENT OF COOLING CIRCUIT WATER

This application is a continuation of application Ser. No. 07/239,713, filed on Sept. 1, 1988, now abandoned.

BACKGROUND OF THE INVENTION

1. Field of the Invention

This invention relates to a process and an apparatus for the treatment of the circulating water of an open circulation cooling system, particularly a cooling tower circulation system.

2. Statement of the Prior Art

In known open cooling systems with circulating cooling water, losses of water through evaporation have to be made up and additives introduced into the cooling circuit water to prevent corrosion of metal components and/or the formation of organic, inorganic or biological deposits. Apparatuses for performing this function are known, carrying out partial functions necessary for the treatment of the circuit water, such as analysis, addition of chemicals and/or partial filtration of suspended matter. Accordingly, many different apparatuses are required for the complete monitoring of circulation cooling systems, generally being arranged at different points—more or less remote from one another—of an open circulation cooling system so that monitoring and maintenance of the individual apparatuses and, therefore, monitoring of the circulating water of open circulation cooling systems is labor-intensive and expensive of plant. More specifically, the condition of the circulating water is very difficult to monitor by such known systems.

There is a need for an automatic system which simplifies and coordinates the monitoring and treatment of the circulating water of open cooling systems at a central location and enables these functions to be carried out over prolonged periods with no need for laboratory analysis or monitoring personnel.

SUMMARY OF THE INVENTION

The present invention relates to a novel process and apparatus by which at least one partial stream is branched off or diverted from the circulating main water supply at a centralized priority location and is monitored and treated and returned to the main water supply to maintain the desired properties thereof. Monitoring of the partial stream is conducted within a novel apparatus having stations in which the pH value of the partial stream is measured and acid is added to maintain the desired pH value, depending upon whether the measured pH value is higher than desired. The apparatus also includes stations in which the conductivity of the partial stream is measured, preferably inductively, and an elutriation unit is activated, in dependence upon the measured conductivity value, to drain off excessively-conductive water, which is replaced with fresh water. The apparatus further includes a station in which a corrosion inhibitor is added to the partial stream in dependence upon the quantity of fresh water added to the circulating water and/or to compensate for losses, and preferably also includes stations in which organic and/o inorganic biocides are added to the partial stream at timed intervals through dosing units. The apparatus also includes a filter station in which the partial stream is filtered with automatic backwashing, and means for continuously returning the partial stream to the circulating main water supply.

The personnel and equipment required to monitor the circulating water of open circulation systems is clearly reduced by the process and apparatus of the present invention which enables the circulating water to be monitored automatically in a central standardized module which accommodates the various stations required for monitoring the circulating water. These stations are directly monitored and maintained at the central location where the module is installed. By virtue of the automated monitoring and treatment cycle and the various station units coordinated with one another in their performance rating and their dimensions, laboratory analysis of the circulating water can be carried out weekly rather than daily, as required by known systems. In the process according to the present invention, at least one partial continuous stream is diverted from the main supply conduit through a compact standardized module which accommodates all the key stations for the testing and treatment of the circulating water compactly in a small space and then returns the treated diverted stream back into the water supply in the main conduit. The present process includes the step of measuring the pH value of the cooling water of the diverted stream and the step of adding a certain proportional quantity of acid, depending upon the measured pH value, in order to maintain the pH value of the circulating water in the main supply conduit within a certain predetermined range, thus counteracting deposits of lime and zinc for example. The process also includes the step of measuring the conductivity of the partial stream, preferably inductively, to detect salting up of the circulating water as a result of evaporation and to enable the predetermined desired salt concentration to be established in the circulating water by the steps of actuating an elutriation unit and introducing fresh water. The present process includes the further step of adding corrosion inhibitor to the partial stream depending upon the quantity of fresh water added to the circulating water to compensate for drainage and evaporation losses. The present process may also include the step of adding organic and/or inorganic biocides to the partial stream at regular time intervals to avoid biological and particularly microbiological deposits in the open circulation cooling system. The present process includes the step of filtering the partial stream of suspended matter and the step of returning the treated partial stream to the main conduit, carrying sufficient amounts of acid, corrosion inhibitor and biocides to produce the desired values in the total volume of circulating water. These steps, which can be carried out successively in any order, are sufficient for maintaining the cooling effect of the cooling medium, water, in open circulation systems and can be performed without expensive and complicated technical equipment, such as monitoring electronics for example.

In one embodiment of the present invention, a continuous partial stream is diverted or branched from the circulating water supply conduit into a diversion conduit having a capacity which corresponds substantially to a predetermined minor percentage, such as 10%, of the total volume of the circulating water supply flowing through the main conduit past the branching point. This portion or minor volume of the total water supply is sufficient for maintaining the operational effectiveness of open circulation cooling systems and, in general, can be handled and treated by a compact module.

In another embodiment of the invention, any necessary additives initiated in the module are quantitatively proportional. Quantitatively proportional in the present context means that the quantity of any additive depends upon the proportion of the diverted water volume relative to the total volume of supply water in the main conduit, including the volume of water added to the circulating water per unit of time to compensate for evaporation losses and elutriation losses. An addition made on this basis has proved to be particularly effective for carrying out the process.

The effect of the quantitatively proportional addition, in conjunction with the conductivity measurement with connected elutriation, is that constant conditions are established in the circulating water, permitting much longer monitoring intervals than daily analyses.

DETAILED DESCRIPTION

Figure 1:
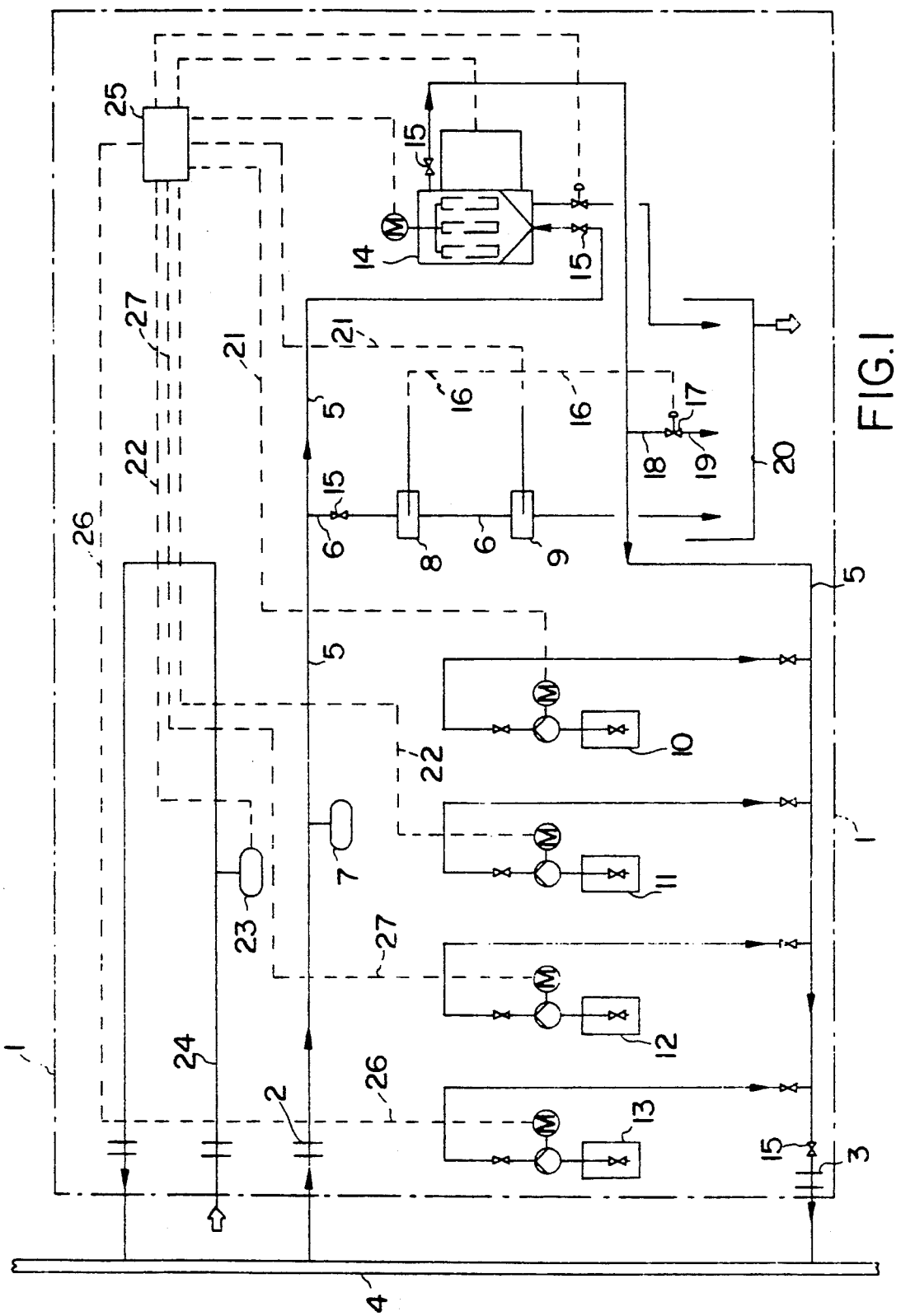
FIGURE 1 illustrates a basic process diagram for the automatic and continuous operation of the apparatus of the present invention.

The present invention provides a process and an apparatus which is characterized by a compact, standardized module through which a partial stream of the circulating water supply flows, and which includes the following integrally-arranged, automatic stations. Station (a) comprises means for measuring the pH value of the partial stream and for activating a dosing unit for automatically adding a predetermined amount of an acid to maintain the desired pH value in the circulating water supply. Station (b) comprises means for measuring the conductivity of the partial stream, preferably inductively, and for activating an associated automatic elutriation unit to drain off excessively-conductive water. Station (c) comprises a means for the automatic addition of corrosion inhibitor to the partial stream, and is operatively connected to and activated by an auxiliary flow volume counter recording the volume of fresh outside water added to the circulating water. Station (d) comprises optional means for the separate and timed automatic addition of organic and/or inorganic biocides to the partial stream and, station (e) comprises means for filtration of the partial stream, more especially a filter with automatic backwashing, prior to the introduction of additives and prior to the return of the partial stream to the remainder of the circulating water.

The present module for a cooling water treatment station accommodates all the key units for the treatment of recirculating cooling water and can readily be arranged at a central priority location of the cooling circuit water system. The module is easy to maintain and monitor and affords the advantages as described in the foregoing in reference to the present process.

To obtain the compact modular form of the apparatus according to the invention, the dimensions of the diversion conduit receiving the partial stream of water are such that the total diversion conduit continuously takes up a predetermined minor volume, preferably about 10% of the total volume of the stream of the circulating water supply flowing through the main conduit past the branching point with the diversion conduit.

According to a preferred embodiment of the present invention the flow volume counter or meter controls the volumes of one or more of the additives to be dispensed by the dosing units. Using the flow volume counter, it is possible for example to automatically record the additional volume of fresh water, from an outside inlet water pipe, which is added to the circulating water to compensate for drainage and/or evaporation losses, to control the quantity of cooling water treatment preparations or additives to be dispensed automatically by the individual units. These features, along with the rating of the partial stream uptake capacity, preferably about 10% of the main supply stream of circulating water flowing past the branching point, contribute towards the effectiveness of the compact modular form of the apparatus of the present invention. The minor quantity or volume of the partial stream passed through the apparatus is sufficient to enable the major volume of supply water in the cooling circuit system to be adequately supplied with the additions required while maintaining cooling capacity.

The accompanying drawing illustrates a standard module, generally denoted by the reference number 1, for controlling the present apparatus for treating the circulating water of open circulation cooling systems and comprising the units shown inside the dash-dot box in FIGURE 1. Module 1 is connected by flanged pipe joints 2 and 3 to the main conduit 4 containing the circulating water supply stream of the cooling system, which supply stream is circulated through the supply main conduit 4. A partial stream is diverted or branched off from the main conduit 4 at the inlet connection 2, passed through the cooling water treatment station in the direction of the arrows in the diversion pipe 5 and discharge pipe 6 and the major portion of the partial stream which is not conducted through the discharge pipe 6 is passed through the filter 14 and returned to the circulation water supply stream in the main conduit 4 through the outlet connection 3. The pipe 5 is designed in such a way that it continuously takes up about 10% of the total volume of the stream of circulating supply water flowing through the main conduit 4 past the inlet connection 2. The partial stream volume flowing through the module through diversion pipe 5 is measured by a conventional flow meter 7. In addition, dosing units 10, 11, 12 and 13, a filter unit 14 with automatic backwashing, an elutriation unit including valve 17, pipes 18 and 19, and drainage funnel 20, and valves 15 are associated with the pipe 5.

The discharge pipe 6 branches off from the diversion pipe 5 ahead of the filter 14 in the direction of flow, further diverting a minor portion of the partial stream of 200 liters per hour or less of the circulating water being treated in the module 1 to an inductive conductivity measuring unit 8 and a pH measuring unit 9. The pipe 6 branches off from the pipe 5 beyond the flow meter 7, i.e. almost immediately after the point of connection 2 between the main conduit 4 and the intake pipe 5 and opens into the drainage funnel 20 of the elutriation unit beyond the measuring units 8 and 9. Valves 15 are arranged in the pipes to regulate the volume of the partial stream of cooling water.

The inductive conductivity measuring unit 8 is operatively connected by an electrical line 16 to the elutriation valve 17 of the elutriation unit which, in its open position, enables circulating water to flow off from the diversion conduit 5 of the cooling circuit water treatment station through the pipes 18 and 19. Together with the drainage funnel 20, the pipes 18 and 19 and the elutriation valve 17 form one embodiment of the elutriation unit. The inductive conductivity measuring unit 8 is set at a certain conductivity value and, when this value is exceeded, for example in the event of a high salt concentration, the elutriation valve 17 is caused to open. The pH measuring unit 9 is connected by an electrical line 21, through a central control unit 25, to an acid dosing unit 10. The pH measuring unit 9 is set at a certain predetermined pH value and, when this value is exceeded, the acid dosing unit 10 is activated to pump acid, for example concentrated sulfuric acid, into the pipe 5. Corrosion inhibitor, for example a conventional stabilized, optionally zinc-containing, treatment preparation, is introduced into the pipe 5 upon activation of the dosing unit 11. The dosing unit 11 is connected by an electrical line 22, through a central control unit 25, to another flow volume counter 23 having a pulse generator. This additional flow volume counter 23 is arranged in an inlet water pipe 24 through which additional fresh water is automatically added to the cooling circuit main conduit 4 from an outside supply source to compensate for evaporated water, water which has escaped into the atmosphere and elutriated water. Under the control of the water meter with pulse generator 23, the dosing unit 11 is actuated in dependence upon the volume of fresh water added through pipe 24 to the cooling circuit main conduit 4 through the inlet water pipe 24 and introduces a necessary amount of corrosion inhibitor into the pipe 5 since the fresh inlet water does not contain any corrosion inhibitor. The dosing unit 12 introduces inorganic biocides and the dosing unit 13 organic biocides into the pipe 5. This is done automatically at regular time intervals, for which purpose the dosing units 12 and 13 are actuated by a control unit 25 to which they are operatively connected by electrical lines 26 and 27. The dosing units 10, 11, 12 and 13 consist of at least one storage vessel for the particular treatment preparations or additives, a pump and the necessary fittings.

The diverted stream passes through the filter 14, in advance of the dosing units and introduced additives, which filter removes suspended particles which are flushed to the drainage funnel 20 through a valve actuated through the central control unit 25.

The quantity or volume of partial stream water diverted and flowing through the module 1 is measured by means of the flow meter 7 so as to guarantee the desired 10% partial stream filtration. This partial stream also operates to pre-dilute the quantities of concentrated treatment preparation or additive automatically dispensed by each of the dosing units 10, 11, 12 and 13 to avoid concentration peaks in the main stream. The amount of added acid is proportional to the ratio of the total volume of circulating water in the main conduit 4 to the volume of diverted water in conduit 5, i.e., about 10 times the amount necessary to produce the desired pH in the conduit 5 equals the amount necessary to maintain the desired pH in main conduit 4.

The dosing times and volumes are dependent, for example on the heat capacity of the cooling system, the composition of the water and the product-related effective concentration of the individual treatment chemicals.

It is to be understood that the above described embodiments of the invention are illustrative only and that modifications throughout may occur to those skilled in the art.

We claim:

1. A process for monitoring and treating the circulating water supply of an open water circulation system, comprising the steps of continuously diverting a predetermined portion of the water from a main conduit of said water circulation system through a diversion circuit, measuring the pH of the diverted water portion and adding sufficient acid thereto to maintain the pH of the circulating water supply at a predetermined pH value, inductively measuring the conductivity of said diverted water portion and replacing an amount of said diverted water portion with a measured amount of fresh water added to said main conduit sufficient to adjust the conductivity value of the circulating water supply to a desired conductivity value, filtering said diverted water portion to remove suspended particles therefrom, adding a corrosion inhibitor to said measured amount of fresh water in an amount which is a function of said measured amount of fresh water to produce the desired concentration thereof in the circulating water supply, and returning said diverted water portion from said diversion conduit to the circulating water supply, wherein said steps are integrated and monitored by a central control unit to maintain the desired pH, conductivity and corrosion inhibitor values in said circulating water supply.

2. A process as in claim 1 wherein said diverted water portion comprises about 10% of the total volume of said circulating water supply.

3. A process as in claim 1 wherein the amount of additives added to the diverted water portion is quantitatively proportional to the amount of diverted water portion relative to the total volume of said circulating water supply, including the volume of fresh water added to the circulating water supply.

4. A process as in claim 1 including adding fresh water from a supply inlet to said circulating water supply to compensate for evaporated water and elutriated water, measuring the volume of added fresh water, and adding a sufficient amount of corrosion inhibitor to the diverted water portion to maintain corrosion protection in said circulating water supply.

5. A process as in claim 1 including adding a biocide to the the diverted water portion to maintain a desired concentration thereof in said circulating water supply.

6. A process as in claim 1 including providing an elutriation unit and activating said unit depending upon the conductivity value of said diverted water portion to drain off excessively-conductive water.

7. An apparatus for monitoring and treating the circulating water supply of an open water circulation system wherein a predetermined portion of the water from said water circulation system is continuously diverted through a diversion conduit, comprising fresh water supply means for adding fresh water to said circulating water supply to compensate for water loss due to evaporation and elutriation, and water meter means to measure the volume of added fresh water, inlet means for continuously diverted water from said water circulation system to avoid said diversion conduit, water monitoring and treatment stations location along and connected to said diversion conduit, said stations comprising (a) means for measuring the pH of the diverted water portion and means for activating a dosing unit to add a predetermined amount of an acid to said diverted water portion to maintain a desired pH in said circulating water supply, (b) means for inductively measuring the conductivity of said diverted water portion, means for activating an associated elutriation unit to drain off excessively-conductive water from said diverted water portion and means location upstream of said diversion conduit for replacing said excessively-conductive water with fresh water to adjust the conductivity value of said circulating water supply, (c) means located downstream from said stations (a) and (b) for filtration of said diverted water portion, (d) means located downstream from said station (c) for adding a corrosion inhibitor to said diverted water portion as a function of the volume of fresh water added to the circulating water supply, and outlet means for connecting said diversion conduit to said water circulation system, said stations being integrated and monitored by a central control unit to maintain the desired pH, conductivity and corrosion inhibitor values in said circulating water supply.

8. An apparatus as in claim 7 wherein said diversion conduit contains about 10% of the total volume of said circulating water supply.

9. An apparatus as in claim 7 wherein the amount of additives added to the diverted water portion is quantitatively proportional to the amount of diverted water portion relative to the total volume of said circulating water supply, including the volume of fresh water added to the circulating water supply.

10. An apparatus as in claim 7 including dosing means for introducing a predetermined amount of a biocide into the diverted water portion within said diversion conduit, and timer means for actuating said dosing means at regular timed intervals.

11. An apparatus as in claim 10 wherein said dosing means or said timer means is adjustable so that the quantity of biocide added to said diversion conduit is quantitatively proportional to the volume of said circulating water supply in order to produce the desired biocide concentration in said circulating water supply.

12. An apparatus as in claim 7 including a flowmeter connected to said diversion conduit for measuring the volume of said diverted water portion.

* * * * *